(12) United States Patent
Saito et al.

(10) Patent No.: US 7,469,582 B2
(45) Date of Patent: *Dec. 30, 2008

(54) HEATING RESISTOR TYPE FLOW MEASURING DEVICE HOUSING STRUCTURE HAVING PROJECTION AND RECESS FOR PREVENTING MIS-INSTALLATION

(75) Inventors: Naoki Saito, Tokai-mura (JP); Masayuki Kozawa, Hitachinaka (JP); Shinya Igarashi, Naka-machi (JP); Hiromu Kikawa, Hitachinaka (JP); Akio Yasukawa, Kashiwa (JP); Akira Takasago, Munich (DE)

(73) Assignees: Hitachi, Ltd., Tokyo (JP); Hitachi Car Engineering Co., Ltd., Hitachinaka-shi (JP)

(*) Notice: Subject to any disclaimer, the term of this patent is extended or adjusted under 35 U.S.C. 154(b) by 0 days.

This patent is subject to a terminal disclaimer.

(21) Appl. No.: 11/905,490

(22) Filed: Oct. 1, 2007

(65) Prior Publication Data

US 2008/0022766 A1    Jan. 31, 2008

Related U.S. Application Data

(63) Continuation of application No. 11/440,457, filed on May 25, 2006, now abandoned, and a continuation of application No. 10/478,325, filed on Nov. 20, 2003, now Pat. No. 7,062,964.

(30) Foreign Application Priority Data

May 24, 2001  (WO) .................. PCT/JP01/04378

(51) Int. Cl.
*G01F 1/68* (2006.01)
(52) U.S. Cl. .................................. 73/204.22

(58) Field of Classification Search ............. 73/204.22
See application file for complete search history.

(56) References Cited

U.S. PATENT DOCUMENTS 5,097,841 A * 3/1992 Moriuchi et al. ............ 73/708
6,401,531 B1 * 6/2002 Tank et al. ............ 73/204.21

(Continued)

FOREIGN PATENT DOCUMENTS

JP    59-208421 A    11/1984
JP    9-170940 A    6/1997

OTHER PUBLICATIONS

Japanese Office Action dated Jul. 8, 2008 (four (4) pages).

*Primary Examiner*—Harshad Patel
(74) *Attorney, Agent, or Firm*—Crowell & Moring LLP

(57) ABSTRACT

A heating resistor type flow measuring device comprising a housing having a support part provided between a frame body and a connector and connected to the mounting part of a fluid passage, a flow rate detection element held on the frame body side of the housing, and an electronic circuit held on the housing and connected electrically to the flow rate detection element and the connector, wherein the electronic circuit is held on the frame body side of the housing and positioned in the fluid passage, a member with the rigidity higher than the material of the main structural member of the housing is formed integrally with the support part, the housing is fixed to the fluid passage through the member with high rigidity. A metal plate is inserted into the support part so as to increase rigidity. Further, a distance is provided between the support part and a metal plate forming a route for conducting the heat transferred to the metal base fixing an electronic circuit substrate by a plastic mold so as to form a structure obstructing a heat transfer, or a clearance is provided in a portion spaced by the plastic mold between the support part and the metal base so as to form a structure obstructing a heat transfer.

9 Claims, 15 Drawing Sheets

U.S. PATENT DOCUMENTS

| | | | |
|---|---|---|---|
| 6,427,668 B1 * | 8/2002 | Igarashi et al. | 73/204.22 |
| 6,619,142 B1 * | 9/2003 | Forster et al. | 73/202.5 |
| 6,708,551 B2 * | 3/2004 | Kojima | 73/31.05 |
| 6,805,002 B2 * | 10/2004 | Yonezawa | 73/204.22 |
| 2003/0079524 A1 * | 5/2003 | Dahlin et al. | 73/28.02 |
| 2006/0213254 A1 * | 9/2006 | Satou et al. | 73/31.05 |

* cited by examiner

HEATING RESISTOR TYPE FLOW MEASURING DEVICE HOUSING STRUCTURE HAVING PROJECTION AND RECESS FOR PREVENTING MIS-INSTALLATION

CROSS-REFERENCE TO RELATED APPLICATIONS

This application is a continuation of U.S. patent application Ser. No. 11/440,457 filed May 25, 2006, which is a continuation of U.S. patent application Ser. No. 10/478,325 filed Nov. 20, 2003, which claims priority to Japanese patent application Ser. No. JP2001/04378 filed May 24, 2001, the entire disclosures of which are herein incorporated in their entireties.

TECHNICAL FIELD

The present invention relates to a heating resistor type flow measuring device provided in an intake air system to detect an amount of the intake air into an engine, which is suitable for the control of an automobile engine.

BACKGROUND ART

The heating resistor type flow measuring device comprises a sub-intake air passage part which has a flow measuring part including a heating resistor, etc., and an electronically controlled part which controls the heating of the flow measuring part.

The conventional flow measuring device was influenced easily by heat in the engine room because an electronic circuit part is provided on the wall of the intake air pipe in one.

Then, the device (hereafter, slot-in type) that improves the cooling effect of the electronic circuit part by the intake air has been known, in which the electronic circuit part is located in the intake air pipe of the engine to reduce the influence due to such heat.

There is the technology disclosed to the Japanese Patent Application Laid-Open No. 11-14423 as an example of the slot-in type.

In this prior art, the housing part and the sub-intake air passage part are molded separately, and they are firmly fixed side-by-side. At the same time, they are arranged in a longitudinal direction on a plate-like metal base with mechanical strength, and the housing part and the sub-intake air passage part are firmly fixed to the metal base. The fixing among the housing part, the sub-intake air passage part, and the metal base shares two mutually different members.

In the above-mentioned slot-in type, even if the outside of the intake air pipe in the engine room- becomes 80° for instance, the temperature of air in the intake air pipe is about 20° and it is low. Therefore, enough cooling effect is obtained.

Moreover, an individual size in the longitudinal direction is shortened by separately molding the housing part and the sub-intake air passage part, which consist of the plastic material. As a result, the dimensional change when both parts are initially molded is suppressed. Because the housing part and the sub-intake air passage part are fixed on the metal base with the predetermined mechanical strength at the same time as both are fixed, the dimensional changes when assembled and elapsed are suppressed small respectively, and the size accuracy is secured. As a result, the influence on the accuracy of measurement due to the dimensional change is reduced. Therefore, the air flow rate can be measured with a high degree of accuracy.

However, there is still room of the improvement about reliability to the vibration because in the flow measuring device of the above-mentioned slot-in type, the influence due to the resonance with the vibration of the engine is thought.

Moreover, there is still room of the improvement about the method of improving the heat influence on the heating resistor and the temperature sensitive resistor and the intake temperature sensor and the measurement accuracy of the temperature of the intake temperature sensor in order to increase the measurement accuracy of the flow rate.

With regard to these points, the explanation is given hereinafter.

First of all, for the vibration, because the electronic circuit part is arranged in the fluid passage, and a metal base is arranged in the fluid passage for the heat radiation of a transistor for current amplification, the part where mass is large takes the structure thrust out in the intake air pipe from the lower side of the support part in the above-mentioned prior art. As a result, the resonance frequency is decreased easily.

Then, it is possible to increase strength by thickening the thickness of the resin in the support part, and thickening the thickness of the resin of the root part of the housing.

However, the flatness may be decreased due to the generation of the surface sink and the camber, etc. when molded because of the temperature difference generated between the inside and the outside of the resin when cooling. Especially, it is important to prevent surface sink and camber being generated in order to make the lower side of the support part contact closely with the sealant to maintain airtight in the fluid passage.

Further, for the thermometry accuracy, in the above-mentioned prior art configuration, the metal base is arranged in the fluid passage and it is exposed directly to the fluid. As a result, the heat of the internal combustion engine is transferred to the body or the fluid passage structural member, which forms the fluid passage. It is thought that it is easy for the heat to transfer to the heating resistor and the temperature sensitive resistor through the metal plate in the support part to fix it to the body, and further through the metal base and the support terminal.

Especially, at low flow rate, the temperature sensitive resistor, which detects the intake temperature, may detect higher temperature than actual intake temperature. Therefore, more heating currents are supplied to the heating resistor, which keeps temperature difference with the temperature sensitive resistor constant, and a larger flow rate is measured from the actual flow rate. As a result, there is a possibility that the accuracy of measurement is not obtained enough.

Similarly, also for the intake temperature sensor, which measures the intake temperature in the fluid passage, a larger flow rate is measured from the actual flow rate. As a result, there is a possibility that the accuracy of measurement is deteriorated.

DISCLOSURE OF INVENTION

An object of the present invention is to provide a heating resistor type flow measuring device of the slot-in type with high reliability which can solve various problems in the above-mentioned prior art, excels in the vibration-proof, and does not cause easily the characteristic error due to the heat influence of the internal combustion engine.

In order to solve the above-mentioned problem, a heating resistor type flow measuring device is assumed to be the following configuration in the present invention. That is, the present invention is characterized by a heating resistor type flow measuring device comprising a housing having a support part provided between a frame body and a connector and connected to the mounting part of a fluid passage, a flow rate detection element held on the frame body side of the housing, and an electronic circuit held on the housing and connected electrically to the flow rate detection element and the connector, the electronic circuit being held on the frame body side of the housing and positioned in the fluid passage, a member with the rigidity higher than the material of the main structural member of the housing being formed integrally with the support part, and the housing being fixed to the fluid passage through the member with high rigidity.

A metal plate for reinforcement is put into the support part to install the heating resistor type flow measuring device in the fluid passage, and said housing is fixed to said fluid passage through the member with high rigidity.

Therefore, the rigidity can be raised compared with the case where the support part is fixed by plastic of the same thickness, and the resonance frequency can be improved according to the present invention.

The support part consists of two layers of a plastic and a metal plate, or three layer of a plastic, a metal plate, and a plastic according to the preferable embodiment of the present invention.

Moreover, the temperature difference between the inside and the outside can be reduced by thinning the thickness of the resin in the support part and placing the metal plate between the resins according to the present invention. Therefore, the surface sink when molded can be prevented, and the deviation from flatness of the undersurface of the support part can be satisfied.

If the metal plate for reinforcement is put in the support part, it becomes possible to transfer the heat from the body arranged in the internal combustion engine easily to the heating resistor and the temperature-sensitive resistance through a metal plate, a metal base, and a support terminal.

It becomes possible to form a structure obstructing a heat transfer by providing a distance between the support part and a metal plate forming a route for conducting the heat transferred to the metal base fixing an electronic circuit substrate by a plastic mold, or it becomes possible to form a structure obstructing a heat transfer by providing a clearance in a portion spaced by the plastic mold between the metal plate inserted into the support parts and the metal base, or it becomes possible, or it becomes possible to separate a detection element support terminal where heat is transferred easily from the heat source and to obstruct the heat transfer by inserting the conductor provided to an electronic circuit between each detection element and a connection terminal.

The decrease in the heat influence on the heating resistor and the temperature sensitive resistor that measure the flow rate, the temperature sensitive resistor that detects the intake temperature, and the intake temperature sensor becomes possible by adopting the above-mentioned structure.

Moreover, enlarging a metal base to cool the transistor for current amplification enough becomes possible because the heat influence is decreased if the heating resistor, the temperature sensitive resistor, and the intake temperature sensor are covered with a metal base.

Further, it is possible to prevent the transformation due to surface sink caused in the thickness meat when forming a plastic molding by thinning the portion spaced by the plastic mold between the metal plate inserted into the support part and the metal base, and to make a sealant provided between the support part and the body to maintain airtight in the fluid passage to be a contact structure.

Another feature of the present invention are in providing the dropout prevention mechanism for said metal base to a frame of said housing in the structure spaced by the plastic mold between the metal plate inserted into the support part and the metal base. As a result, even if the joint of the housing frame with the metal base peels off, a metal base can be prevented from falling in the fluid passage.

In a further feature of the present invention, the electronic circuit is held on the inside of the frame body of the housing and positioned in the fluid passage, and a part of the connector terminal provided in said connector is extended to the frame body part to reinforce the frame body of said housing in a heating resistor type flow measuring device.

Thus, the rigidity of housing frame can be improved by inserting a part of the metal plate to both or either of housing frames in order to reinforce them.

In a further feature of the present invention, the electronic circuit is held on the inside of the frame body of the housing and positioned in the fluid passage, and a part of the metal plate formed integrally with said support part is bent and inserted into the frame body of said housing in a heating resistor type flow measuring device. Also in this case, the rigidity of housing frame can be improved.

In a further feature of the present invention, the electronic circuit is held on the inside of the frame body of the housing and positioned in the fluid passage, and said connector terminal to connect electrically to the external equipment provided through the frame body has a part where width was thinned in a plastic thick wall part provided in the frame body of said housing in a heating resistor type flow measuring device. The structure in which the vibration-proof is improved, and the characteristic error due to the heat influence of the internal combustion engine is not caused easily can be obtained according to this feature.

Thus, a heating resistor type flow measuring device that reliability is high can be obtained according to the present invention, in which the vibration-proof is improved, and the characteristic error due to the heat influence of the internal combustion engine is not caused easily.

BRIEF DESCRIPTION OF DRAWINGS

FIG. 9 is a sectional view in which FIG. 8 is seen from the metal base side.

BEST MODE FOR CARRYING OUT THE INVENTION

Hereafter, an embodiment of the present invention will be concretely explained.

FIG. 1 to FIG. 9 show a first embodiment of a heating resistor type flow measuring device according to the present invention.

Figure 1:
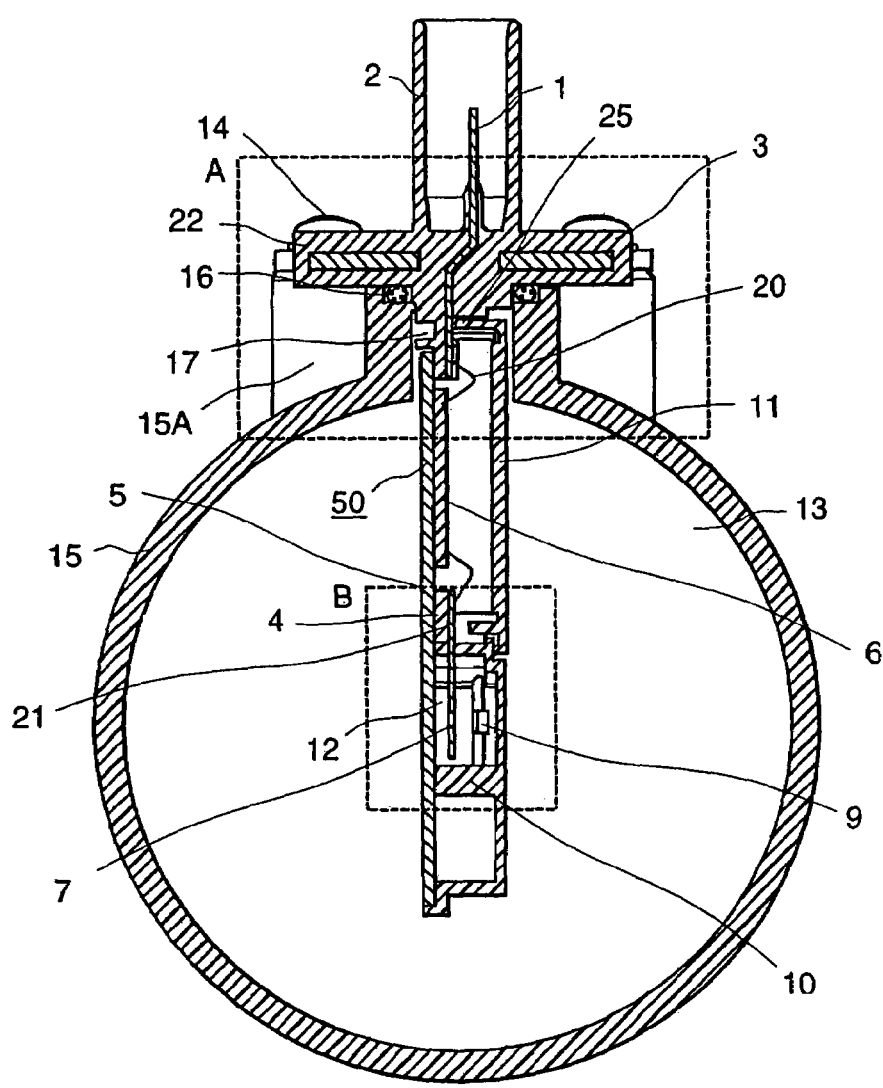
FIG. 1 is a sectional view seen from the upstream side of the fluid passage, which shows a first embodiment of heating resistor type flow measuring device according to the present invention.
Figure 2:
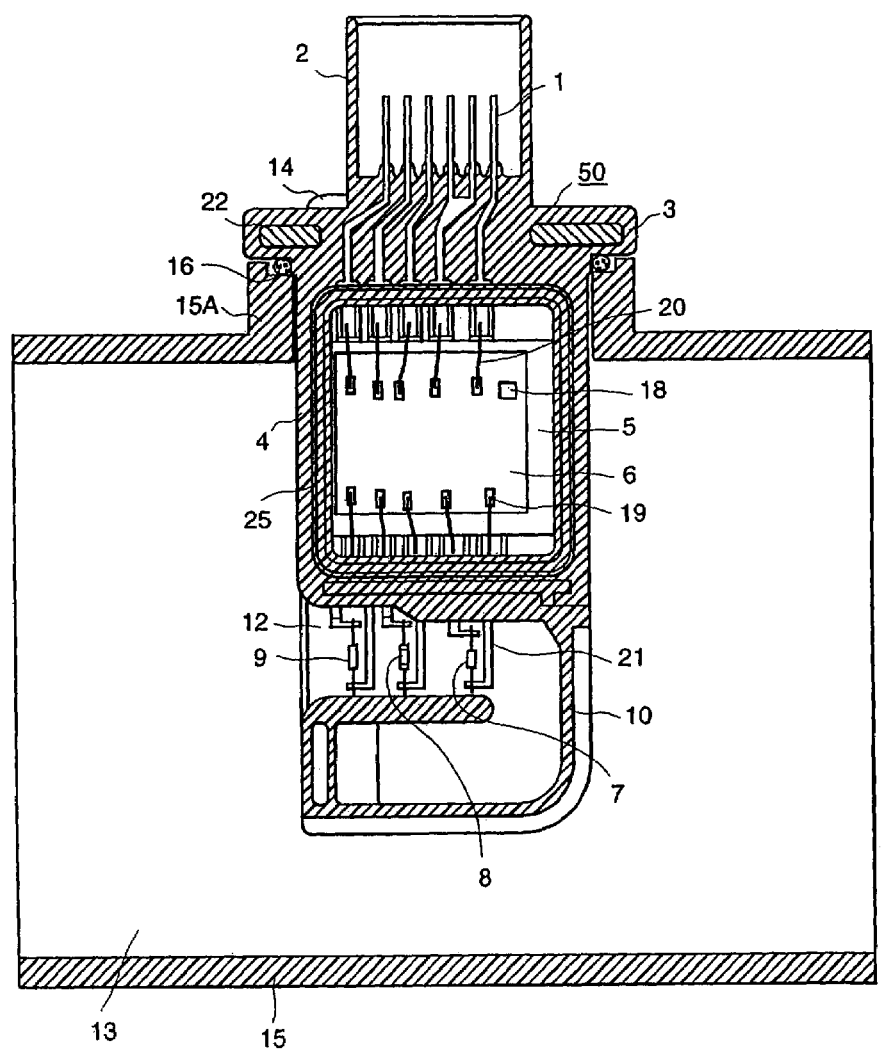
FIG. 2 is a view showing the II-II section of FIG. 1.

FIG. 1 is a sectional view of the first embodiment seen from the upstream side of the fluid passage. FIG. 2 shows a longitudinal section of the first embodiment shown in FIG. 1.

A heating resistor type flow measuring device of the present invention has housing 50 in which support part 3 is provided between frame and connector 2 and it is fixed to the attaching portion 15A of fluid passage 15. Connector terminal 1 is provided in connector 2.

Electronic circuit 6 is fixed on aluminum-made metal base 5 formed integrally with plastic frame body 4 or the frame of housing 50 and is protected by a cover.

Sub-intake air passage 12 where the flow measuring part including heating resistor 7 and temperature sensitive resistor 8 is built into, and electronically controlled part 6 (electronic circuit) where the heating of the flow measuring part is controlled are provided in frame body part 4 of housing 50.

Metal plate 22 for reinforcement is formed integrally with support part 3 of housing 50, and connector 2 to connect to external equipment electric further has been integrated. Metal base 5 has a smooth side where electronic circuit 6 is fixed and the top edge is fixed to support part 3 by bonding, etc.

In other words, housing 50 is the one that connector 2 which is the main structural member, support part 3 and frame body part 4 are formed with plastic as one body. Metal base 5 and cover 11 are fixed to frame body part 4, and further the sub-intake air passage 12, the flow measuring part, and electronic circuit are provided in the frame body part.

Housing 50 is fixed to the attaching portion 15A of body 15 that is the fluid passage structural member.

The material whose rigidity is higher than the plastic material which composes the outer frame etc. which are the main structural member, for instance, metal plate 22 is provided to support part 3, and housing 50 is fixed to the attaching portion 15A of body 15 with the screw etc. so as to sandwich metal plate 22 as described in detail hereinafter.

Figure 3:
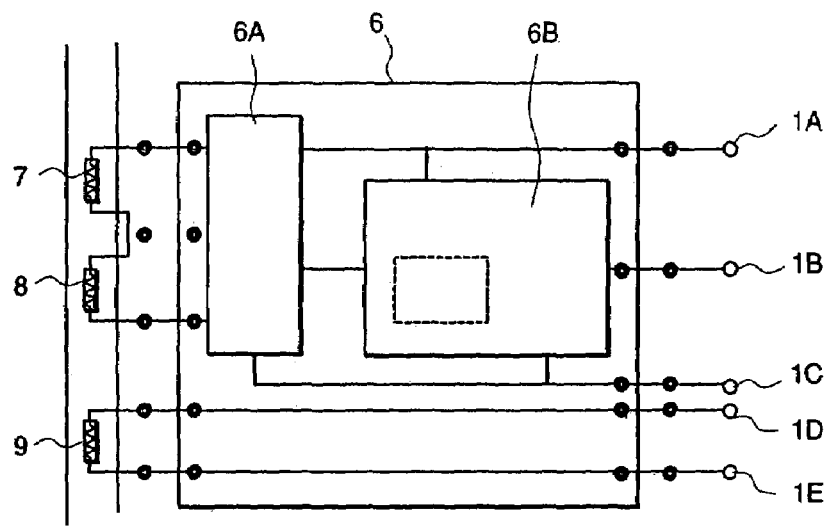
FIG. 3 is a view showing the configuration of an electronic circuit in heating resistor type flow measuring device of FIG. 1.

FIG. 3 is a circuit diagram of electronic circuit 6.

Electronic circuit 6 comprises the bridge circuit 6A and amplifier 6B. Heating resistor 7 and temperature sensitive resistor 8 in the flow measuring part are connected to the bridge circuit 6A, which controls the flow measuring part.

A signal corresponding to the intake air flow rate detected by the bridge circuit 6A is amplified by amplifier 6B which includes transistor 18 for current amplification, and output through connector terminal 1A, 1B and 1C. Moreover, A signal of intake temperature sensor 9 is output through electronic circuit 6, connector terminal 1D, and 1E. Transistor 18 for current amplification is cooled through metal base 5.

Turning back to FIG. 1 and FIG. 2, support part 3 consists of heat insulating plastic, and is fixed to body 15 which is the fluid passage structural member with the screw etc. so as to sandwich metal plate 22.

Body 15 is made of metal such as aluminum, or plastic. Further, connector terminal 1 and support terminal 21 are connected electrically to electronic circuit 6. These terminals are formed to one by plastic molding along with frame body part 4 to fix housing 50 to attaching part 15A of body 15.

Electronic circuit 6 and welding pad 19 formed in the side of electronic circuit 6 are connected electrically to connector terminal 1 by wire bonding 20.

To arrange heating resistor 7 and temperature sensitive resistor 8 in sub-intake air passage 12, those resistors are fixed to support terminal 21 by spot welding. As well as connector terminal 1, support terminal 21 is connected electrically by connecting electronic circuit 6 and welding pad 19 formed at the side of the support terminal circuit through wire bonding 20.

Aluminum-made metal base 5 to fix electronic circuit 6 is formed at the position with which frame body part 4 of housing 50 and by-pass molding 10 are covered. Sub-intake air passage 12 is formed to by-pass molding 10 molded by plastic molding, and heating resistor 7 and temperature sensitive resistor 8 are arranged in this sub-intake air passage 12. By-pass molding 10 unites with frame body part 4 of housing 50, and they are inserted from the rectangular hole made in body 15 which composes the fluid passage, and is tightened and fixed to the attaching portion 15A of body 15 with set screw 14. As a result, a part of the intake air that flows into the engine in intake air passage 13 is branched to sub-intake air passage 12. All flow rate is detected from the branched intake air.

In this embodiment, the influence due to the vibration when heating resistor type flow measuring device is installed in body 15 that composes the fluid passage for an internal combustion engine such as automobiles is considered.

There are two modes in the vibration.

First of all, a first mode of the vibration will be explained.

Figure 4:
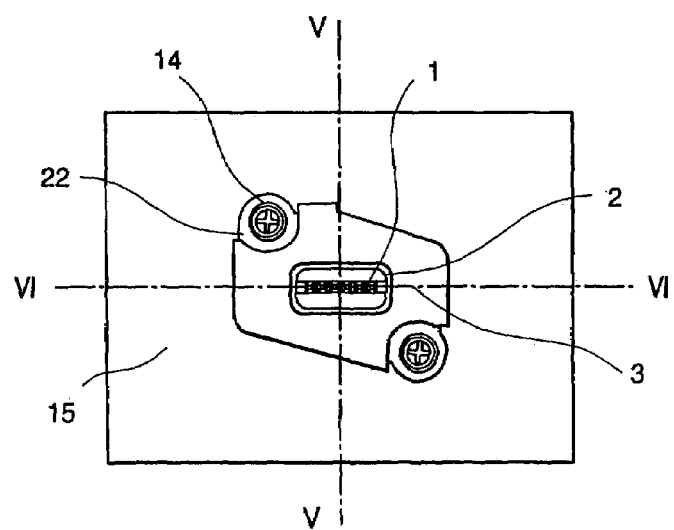
FIG. 4 is a top view showing a main part of the first embodiment of the present invention.

FIG. 4 is a view in which the flow measuring device of FIG. 1 was seen from the upper part.

In general, the method of fixing the tapped hole in two places opened to metal plate 22 inserted in support part 3 with screw 14 is adopted when the heating resistor type flow measuring device is installed in body 15.

Moreover, it does not touch body 15 excluding surroundings of the tapped hole on the back of metal plate 22 inserted in support part 3 or not restrained even if touching the body.

Therefore, support part 3 is transformed centering on the line where the centers of two tapped holes opened to metal plate 22 inserted in support part 3 are connected when resonating when installing it in the engine, and the heating resistor type flow measuring device vibrates.

We have confirmed this fact by using the finite element method analysis.

Metal plate 22 provided separately from metal base 5 installed in frame body part 4 of housing 50 as shown in FIG. 1 and FIG. 2 is molded to one by plastic with support part 3 in the present invention.

It is possible to divide support part 3 into at least two parts and bond them with metal plate 22.

Although the whole metal plate 22 is covered with plastic, it can be partially covered. The rigidity of support part 3 can be improved without thickening the thickness of the resin in support part 3 because support part 3 is formed integrally with metal plate 22. That is, the resonance frequency of the heating resistor type flow measuring device can be raised.

The adoption of metal plate 22 is especially effective in 400 Hz or less in the resonance frequency of heating resistor type flow measuring device. It is possible to use the nonmetal member whose rigidity is higher than the plastic member that composes the principal part such as outer frame of housing 50 in place of metal plate 22.

Moreover, the resonance frequency of the heating resistor type flow measuring device decreases rapidly as the position of the tapped hole is apart from the center as shown in FIG. 4, when support part 3 is composed only of the resin, and is installed in body 5 for instance, when assuming the structure in which the positions of the tapped holes to install housing 50 in body 15 which composes the fluid passage is displaced from the center.

Figure 5:
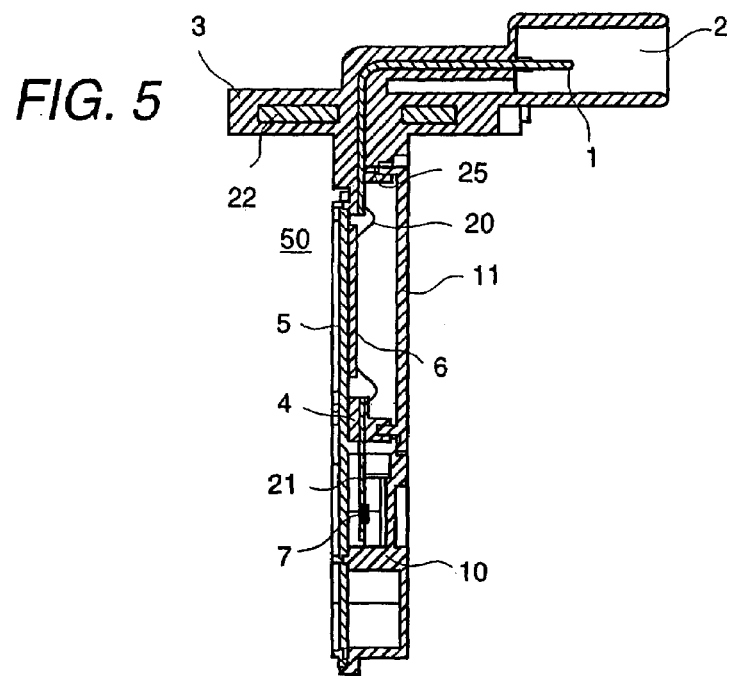
FIG. 5 is a V-V sectional view of FIG. 4, which shows a modified example of the first embodiment of the present invention.

The decrease in the resonance frequency can be reduced, because the structure in which disc metal plate 22 is put in support part 3 is adopted in the present invention. That is, it becomes possible to set the tapped hole at the position displaced from the center, and a variety of connector forms can be used by standardizing the position of the tapped hole. For instance, the structure to turn connector 2 sideways as shown in FIG. 5 in the section in the same direction as FIG. 1 as a modified example of the first embodiment become possible. The cable connected to connector 2 might be able to be shortened by sideways turning connector 2.

Next, the mode of the second vibration considered by the embodiment of the present invention will be explained by using FIG. 1 and FIG. 2.

Because the heating resistor type flow measuring device was assumed to be the structure to arrange metal base 5 in the fluid passage 13, that is, the slot-in structure for the heat radiation of transistor 18 for current amplification, the device becomes the structure in which the part where mass is large thrusts out from the under surface of support part 3. Therefore, heating resistor type flow measuring device is transformed at the root part of housing frame body 4 when resonating and vibrates.

Figure 7:
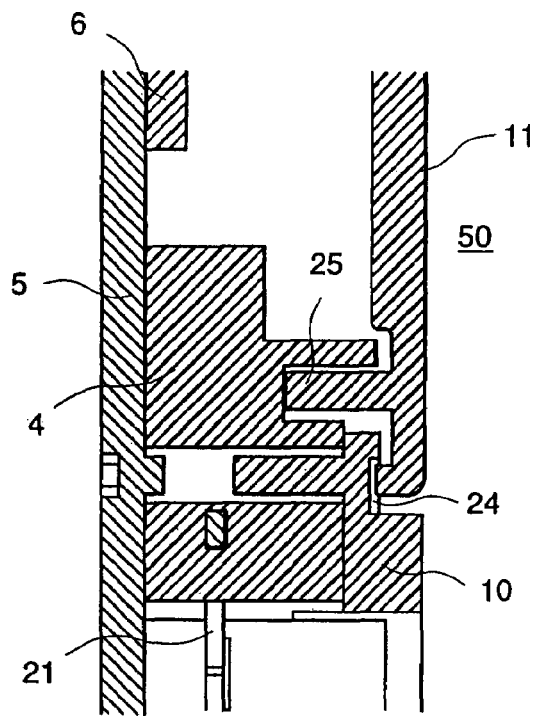
FIG. 7 is an enlarged sectional view of a B-part in FIG. 1, which shows the feature of the first embodiment of the present invention.

The enlarged view of part B of FIG. 1 in a first embodiment of the present invention is shown in FIG. 7.

In this embodiment, cover 11 and by-pass molding 10 are bonded with adhesive 24 of the epoxy system. As a result, housing frame body 4, cover 11, and by-pass molding 10 can be almost integrated, and the rigidity of the heating resistor type flow measuring device can be increased.

Figure 8:
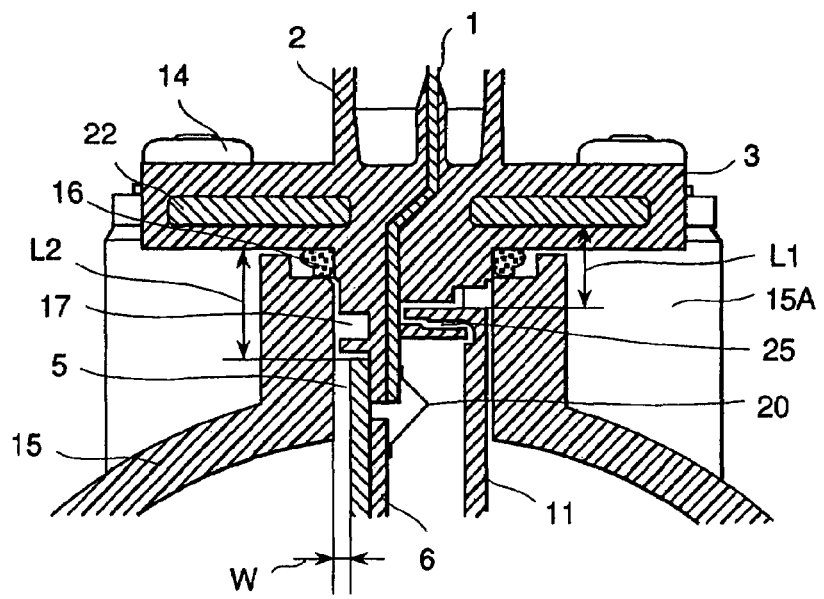
FIG. 8 is an enlarged sectional view of a A-part in FIG. 1, which shows the feature of the first embodiment of the present invention.

Next, the enlarged view of part A of FIG. 1 in a first embodiment is shown in FIG. 8.

Interval L1 from metal plate 22 to bonding groove 25 to bond cover 11 can be taken enough according to this embodiment. 5 mm-20 mm is preferable at these intervals L1. Further, the stress to the adhesive can be eased at the temperature change by thinning width t of connector terminal 1 in the thick wall part in support part 3 (plastic) enough.

Moreover, the thickness of the plastic resin above and below metal plate 22 can be thinly molded without causing surface sink by inserting metal plate 22 into support part 3 though support part 3 is fixed to body 15 through sealant 16 in this embodiment.

Especially, When the thickness of a plastic resin is set to 1.0-2.0 mm in the upper part (the upper part of metal plate 22 in FIG. 8) of support part 3, 1 mm-5.0 mm in the lower part of support part 3 (the lower part of metal plate 22 in FIG. 8), and the thickness of the metal plate put in support part 3 is set to 1.0-2.5 mm, there is an effect to prevent surface sink in support part 3 when molding. As a result, it is possible to obtain a suitable structure for making the lower side of support part 3 close to sealant 16 to maintain airtight in the fluid passage when housing 50 is fixed to the attaching portion 15A.

Next, turning back to the first embodiment, the characteristic of the wall temperature in this embodiment will be explained by using FIG. 1 and FIG. 2.

When the heating resistor type flow measuring device becomes a high temperature for instance by the influence given by other heating units, the heat is transferred to support part 3 of housing 50, connector terminal 1, metal plate 22, frame body part 4, metal base 5, electronic circuit 6, and support terminal 21, and then the heat reaches each detection element. As a result, the heat from other heating units different from actual intake temperature is detected as the intake temperature. The error due to this heat influence is called a characteristic of the wall temperature, and assumed that the better the characteristic of the wall temperature, the smaller the influence is.

In the internal combustion engine such as automobiles, the error is occasionally caused in the measurement of the flow rate because the heat of the internal combustion engine is transferred to temperature sensitive resistor 8 to detect the intake temperature, and the temperature characteristic is deteriorated.

Then, interval L2 is provided in the distance from the lower side of support part 3 which composes integrally with metal plate 22 to the upper side of metal base 5, and the interval L2 is made plastic to mold according to this embodiment as shown in FIG. 8. In other words, the metal with good thermal conduction is not put in intervals L2, and it is assumed the structure that heat is not transferred easily from support part 3 to each detection element.

Further, interval W is provided from the inner wall of the rectangular hole provided in the attaching portion 15A of body 15 to metal base 5, and metal base 5 is assumed to be non-contact to body 15. As a result, an insulated layer by the intake air can be formed, and it is effective in the decrease of the heat influence on temperature sensitive resistor 8 to detect the intake temperature.

Figure 10:
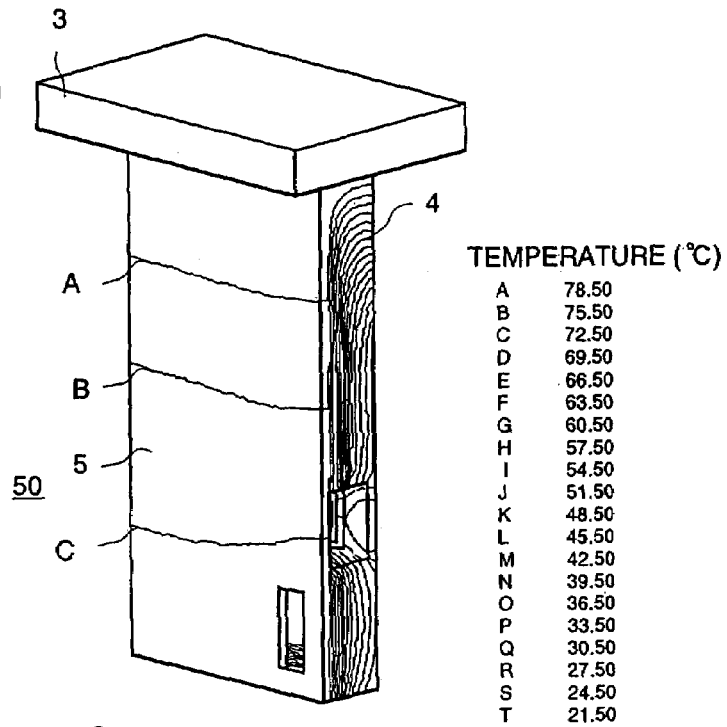
FIG. 10 is a view showing the temperature distribution of an analytical result by CAE when the first embodiment of the present invention is not applied.

To confirm this effect, the temperature distribution of an analytical result by CAE from support part 3 to metal base 5 in the case that there is no interval L2 (L2=0) is shown in FIG. 10.

Figure 11:
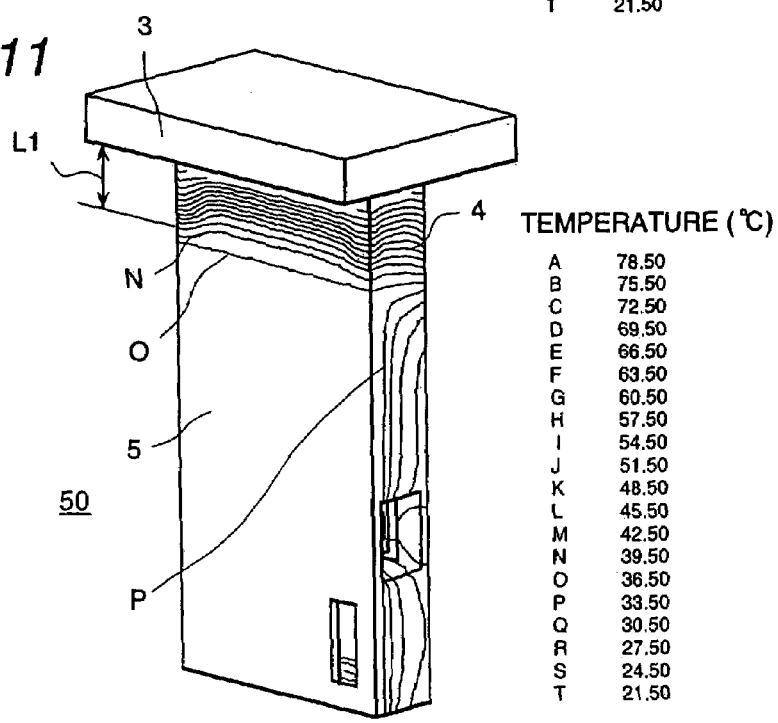
FIG. 11 is a view showing the temperature distribution of an analytical result by CAE when the first embodiment of the present invention is applied.

The temperature distribution of an analytical result by CAE from the support part 3 to metal base 5 according to this embodiment is shown in FIG. 11.

The scale in these figures is a temperature.

It is understood from FIG. 10 that the temperature of metal base 5 has increased when interval L2 is 0 because the heat from support part 3 is transferred directly. On the other hand, it can be confirmed from FIG. 11 that the temperature rapidly falls in an insulated layer of the interval L2, and the temperature of metal base 5 has fallen when the present invention is applied.

Figure 12:
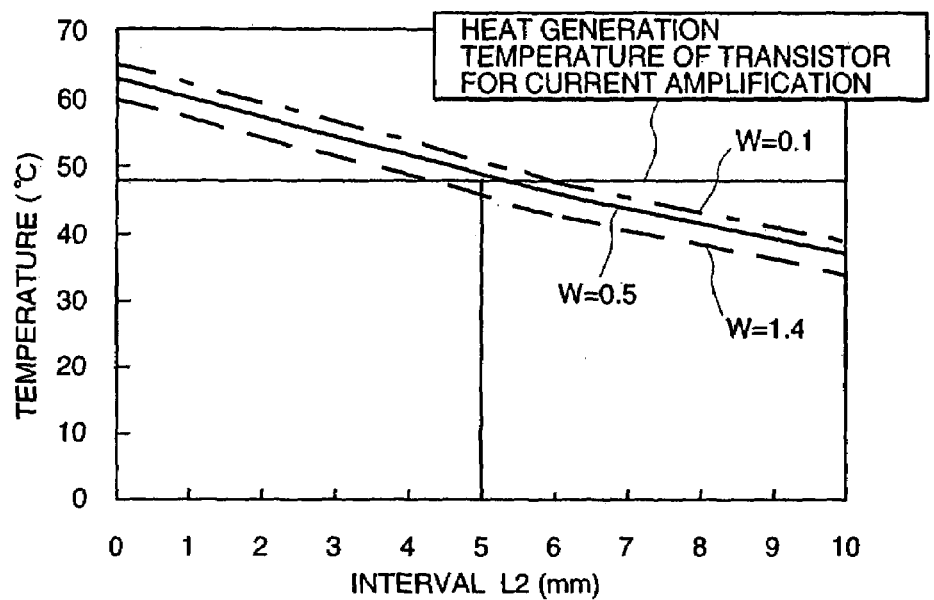
FIG. 12 is a graph where the relationship between the temperature of a metal base in the vicinity of the transistor for power amplification and intervals L1 and W is shown as the effect of the present invention.

The relationship between the temperature of metal base 5 in the neighborhood of transistor 18 for current amplification of electronic circuit 6 and interval L2 and W obtained by calculation, W, and is shown in FIG. 12.

It is preferable that the temperature rise of metal base 5 is lower than the heat temperatures of transistor 5 for current amplification. Therefore, it becomes more effective by providing the interval L2=5 mm-20 mm and W=0.5 mm-1.0 mm.

Further, metal base 5 and metal plate 22 formed integrally with support part 3 are separated as a structure to decrease the heat influence on temperature sensitive resistor 8 which detects intake temperature in this embodiment. That is, interval L2 is provided between support part 3 and metal base 5 as shown in FIG. 8, and thin wall part 17 is given to the part at interval L2.

The influence of the heat of the engine is decreased, and the effect to improve the characteristic of the wall temperature further is achieved according to this structure. Further, there is an effect to prevent the transformation by surface sink caused in the thickness wall part under the support part when a plastic molding, because the under surface of support part which closely contacts sealant 16 when the device is fixed to the fluid passage is required to be flatness as another effect.

Metal base 5 is separated from metal plate 22 formed integrally with support part 3 and the upper edge is fixed to support part 3 by bonding 1 because the heat influence on temperature sensitive resistor 8 which detects the intake temperature is improved in this embodiment. In this case, it is necessary to consider that metal base 5 is dropped from support part 3 by some causes.

There is a possibility for the occurrence of various failures if metal base 5 falls in intake air pipe 13 from housing 50.

Then, this embodiment provides the dropout prevention mechanism of metal base 5. This dropout prevention mechanism will be explained by using FIG. 6 (And, FIG. 9).

Figure 6:
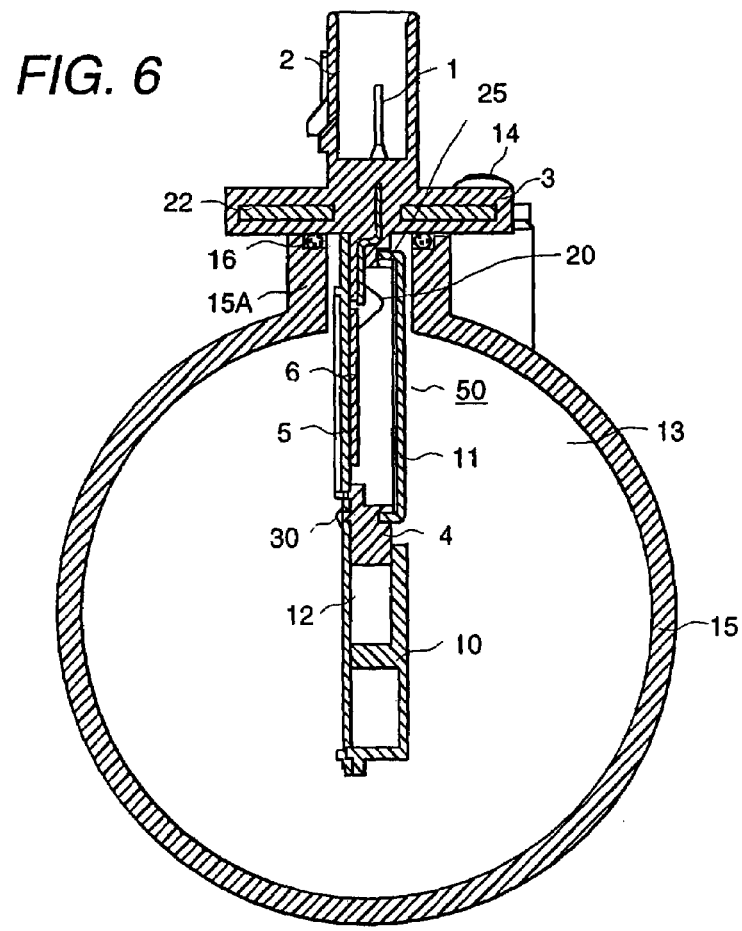
FIG. 6 is a VI-VI sectional view of FIG. 4.

FIG. 6 corresponds to the VI-VI section of FIG. 4 to explain clearly the dropout prevention mechanism, which shows a sectional view taken along the position where the dropout prevention mechanism exists.

Figure 9:
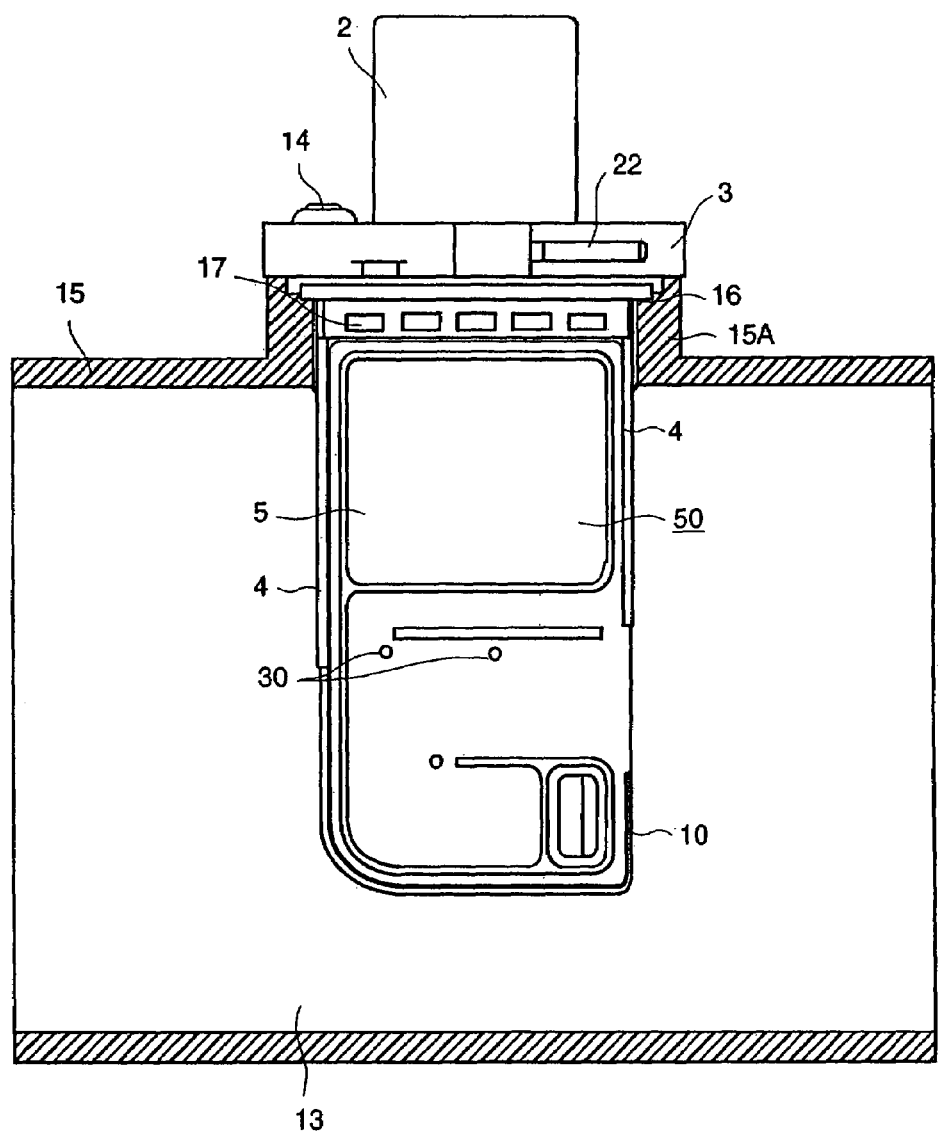

Two or more (two in the embodiment) holes are provided at the lower position from the center of metal base 5, and dropout prevention pin 30 formed as a part of plastic frame body part 4 is press-fitted to each hole as shown in FIG. 6 (and FIG. 9).

Assumed that the thickness of metal base 5 is T3, the length of dropout prevention pin 30 is T1 and the space between frame body part 4 of housing 50 and cover 11 is T2, Metal base 5 can be prevented dropping out at T1>T3 and T3>T2.

Moreover, It is possible to reduce the inclination when metal base 5 comes off from support part 3 by providing two or more holes at the lower position from the center of metal base 5 to the position below, and the effect of the dropout prevention can be improved more.

Next, further operation and the effect of this embodiment will be explained by using FIG. 8.

Sealant 16 was installed between support part 3 and body 15 to maintain airtight in the fluid passage in this embodiment as shown in FIG. 8. That is, sealant 16 is installed within the range of L2 in the distance between the lower side of support part 3 and the top edge of metal base 5. Further, thermal insulating properties can be improved by using rubber material with low thermal conductivity.

Moreover, it is effective in the decrease of the heat influence on intake temperature sensor 9 in the configuration to which intake temperature sensor 9 to measure intake temperature in the fluid passage is provided as shown in FIG. 1 according to this embodiment. Further, temperature sensitive resistor 8 and intake temperature sensor 9 are arranged in the vicinity of the entrance of the upstream in the sub-intake air passage. That is, these are arranged at the relatively remote position from transistor 18 for current amplification. As a result, decreasing the heat influence becomes possible.

Figure 13:
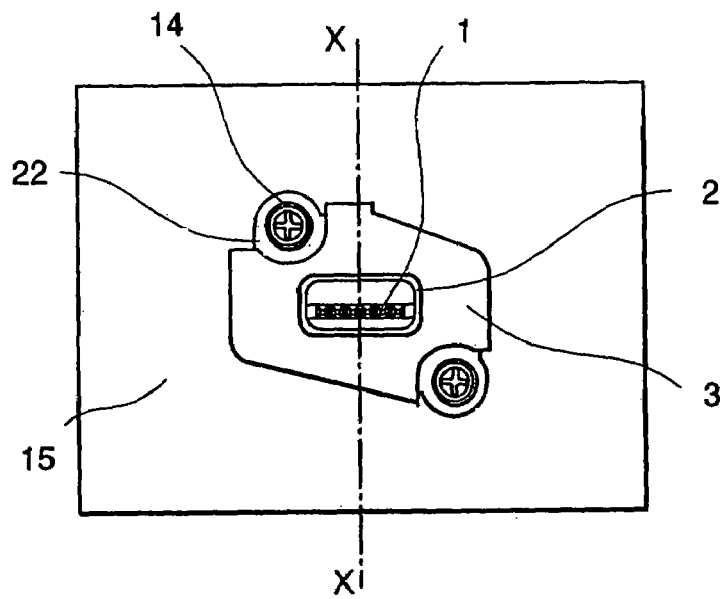
FIG. 13 is a top view of the main part of a second embodiment of the present invention.

Further, there is directionality in heating resistor type flow measuring device, and when installing it in a rectangular hole of body 15, it is likely to be installed by mistake. However, the tapped hole position opened to metal plate 22 can be assumed to be a asymmetrical from the center by adopting this structure as shown in FIG. 13, and the mis-installation can be prevented.

Figure 15:
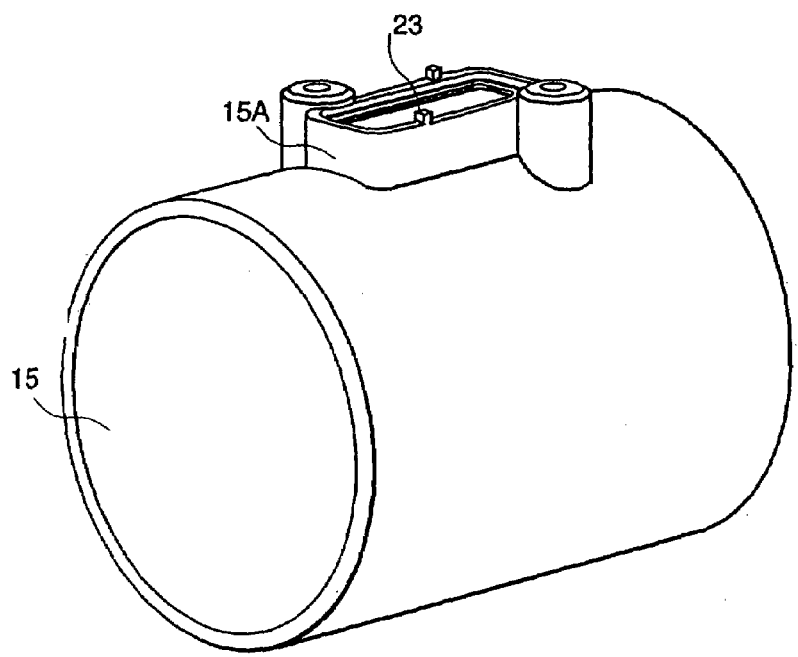
FIG. 15 is a perspective view of FIG. 14, which shows the state where the housing is removed.
Figure 14:
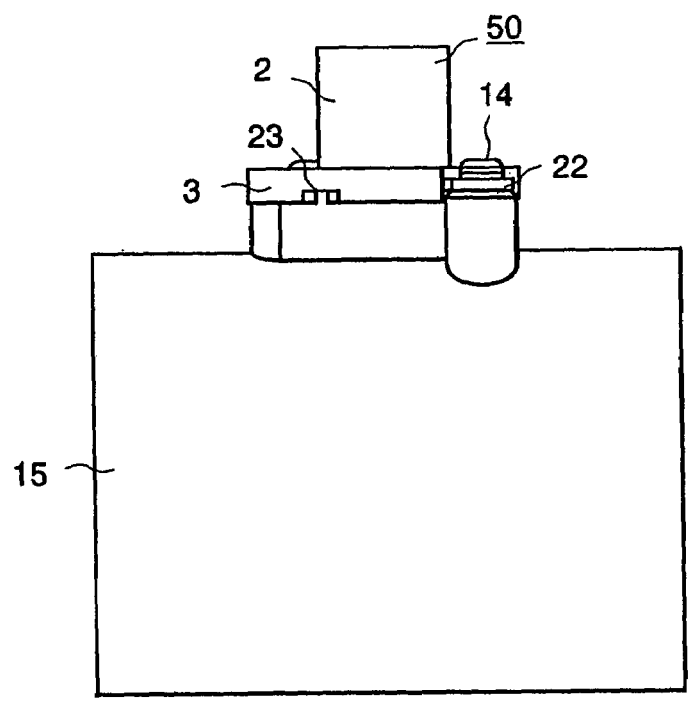
FIG. 14 is a side elevation of FIG. 13.

Next, the side elevation of the third embodiment of the present invention is shown in FIG. 14. Moreover, FIG. 15 is a perspective view of the intake air passage except the housing.

In this embodiment, at least one or more projections 23 contacting support part 3 of the heating resistor type flow measuring device is provided on a part of mounting face of the attaching portion 15A of body 15, and the part where projection 23 is received is provided on support part 3. The part except these components is the same structure as heating resistor type flow measuring device according to the first embodiment. The transformation of support part 3 is suppressed by at least one or more projections 23 provided in the attaching portion 15A of body 15 according to this embodiment. There is substantially the same effect as the increase in the rigidity of support part 3. Moreover, at least one or more projections 23 provided to the attaching portion 15A of body 15 can be used to prevent the mis-installation and position it when installing the heating resistor type flow measuring device.

Another embodiment of the present invention will be explained with reference to FIG. 16.

Figure 16:
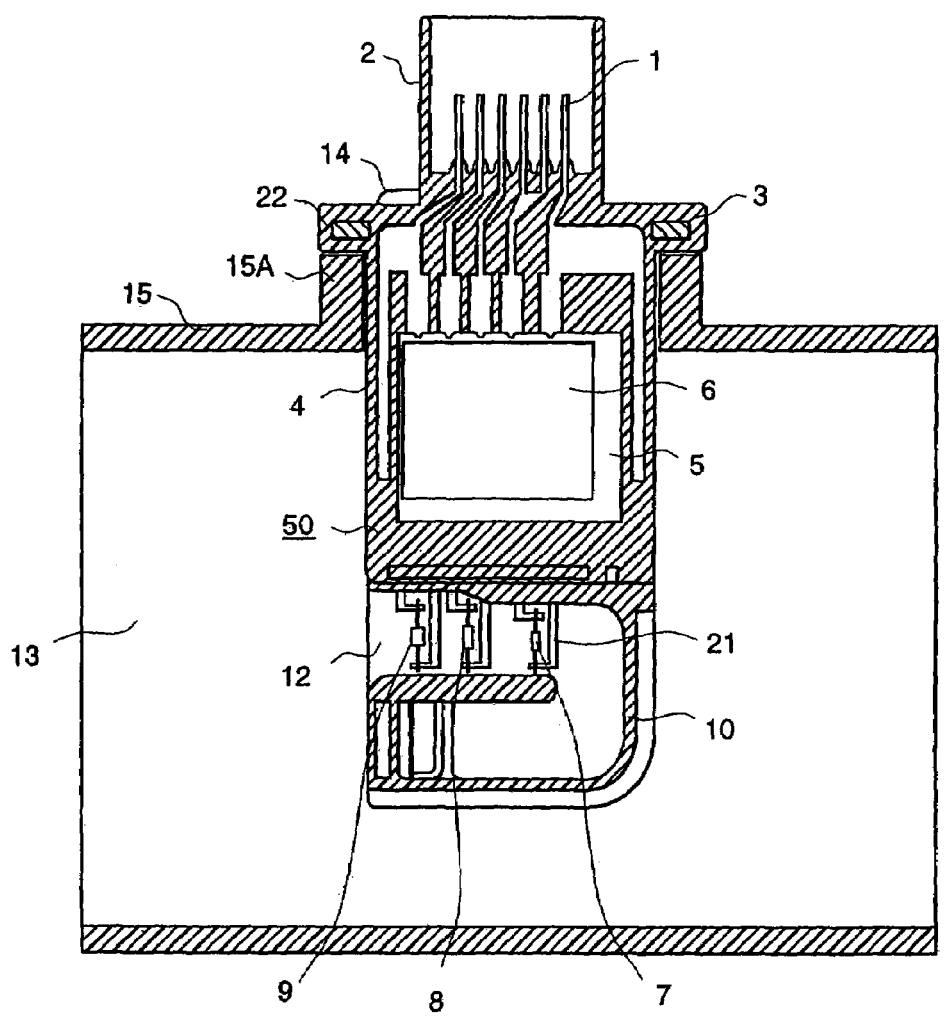
FIG. 16 is a view showing the section that corresponds to the perpendicular side in the section of FIG. 1, which shows another embodiment of the present invention.

FIG. 16 shows the structure in which a part of connector terminal 1 of the heating resistor type flow measuring device is inserted up to housings frame body 4.

It is possible to improve the rigidity of housing frame without increasing the number of parts by inserting a part of metallic connector terminal 1 into both or either of housing frame bodies 4 for reinforcement according to this embodiment.

A further embodiment of the present invention will be explained by using FIG. 17.

Figure 17:
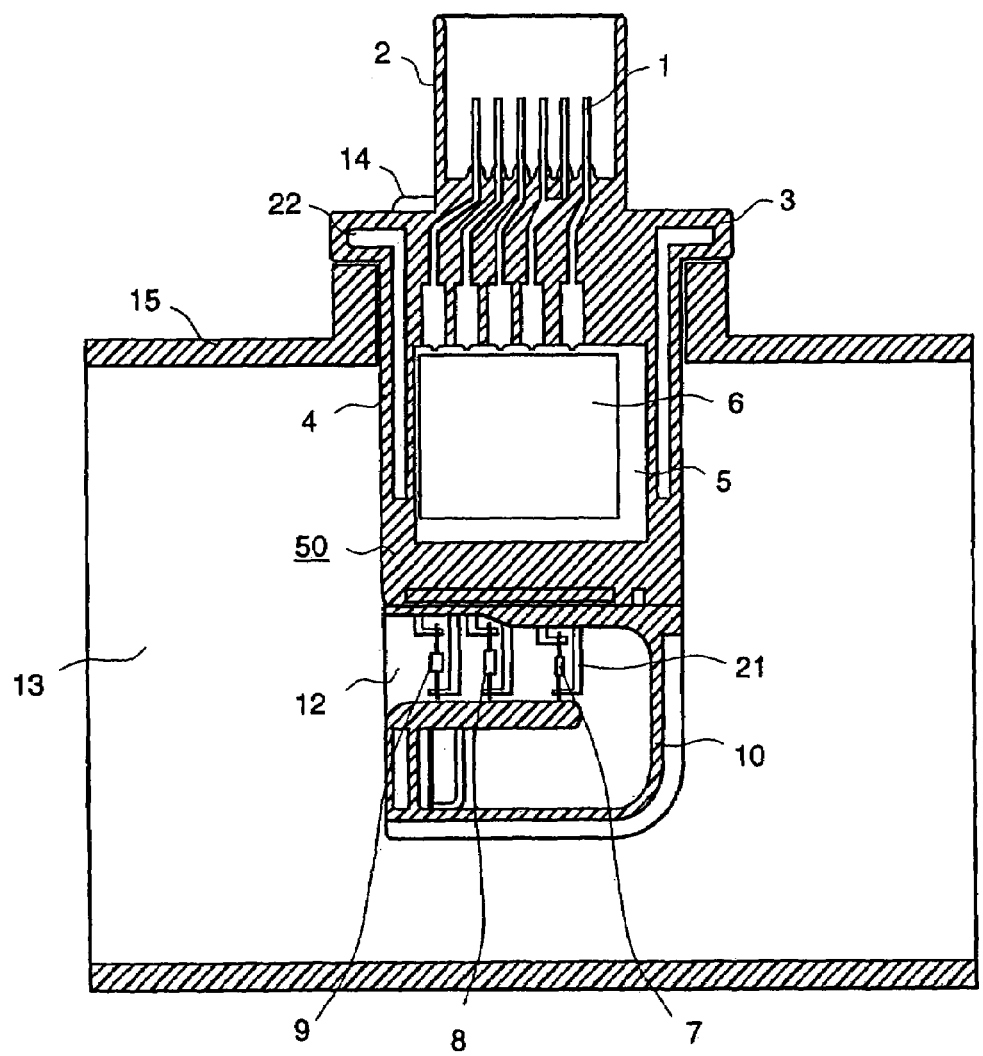
FIG. 17 is a view showing the section which corresponds to the perpendicular side in the section of FIG. 1, which shows a further embodiment of the present invention.

In the housing shown in FIG. 17, a part of the metal plate 22 made integrally with support part 3 is bent toward the housing frame body 4 and inserted into the frame body of said housing.

It is possible to improve the rigidity of housing frame without increasing the number of parts by bending a part of the metal plate 22 toward the housing frame body 4 and inserting it into both or either of housing frame bodies 4 for reinforcement according to this embodiment.

Figure 18:
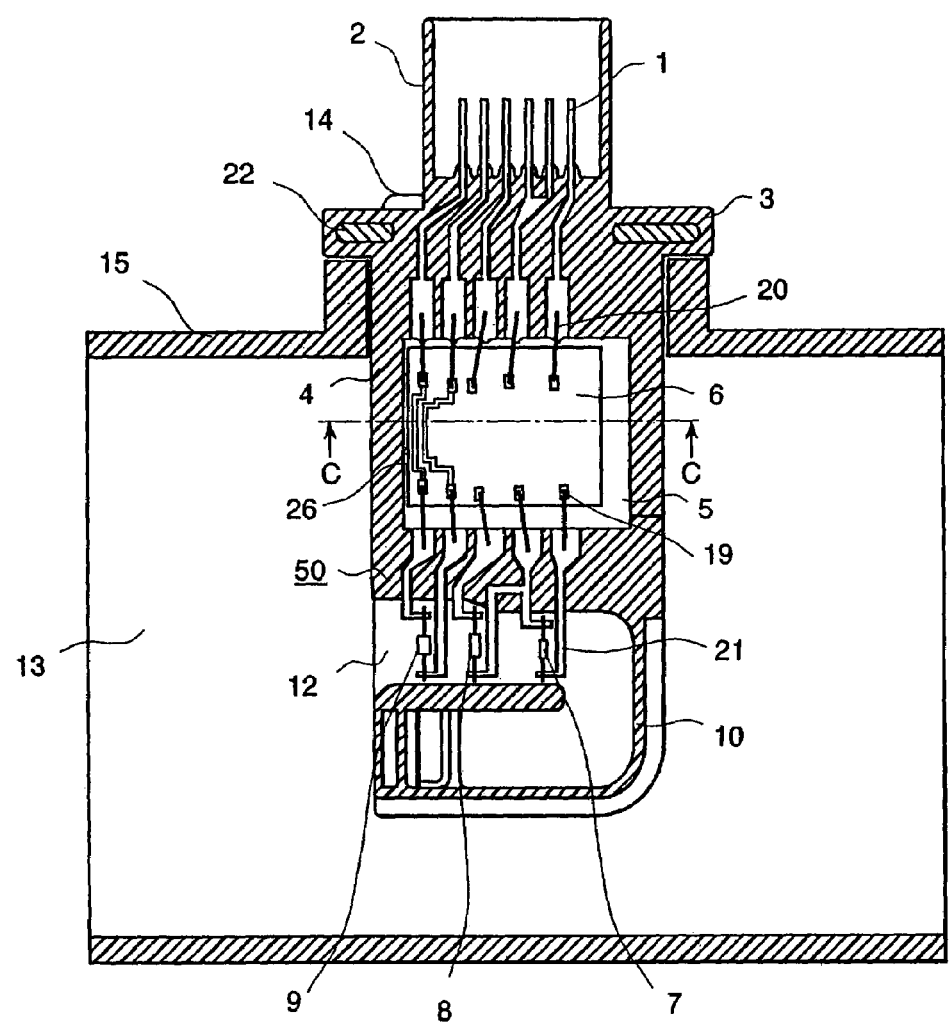
FIG. 18 is a view showing the section perpendicular to the section of FIG. 1, which shows another feature of the first embodiment of the present invention.
Figure 19:
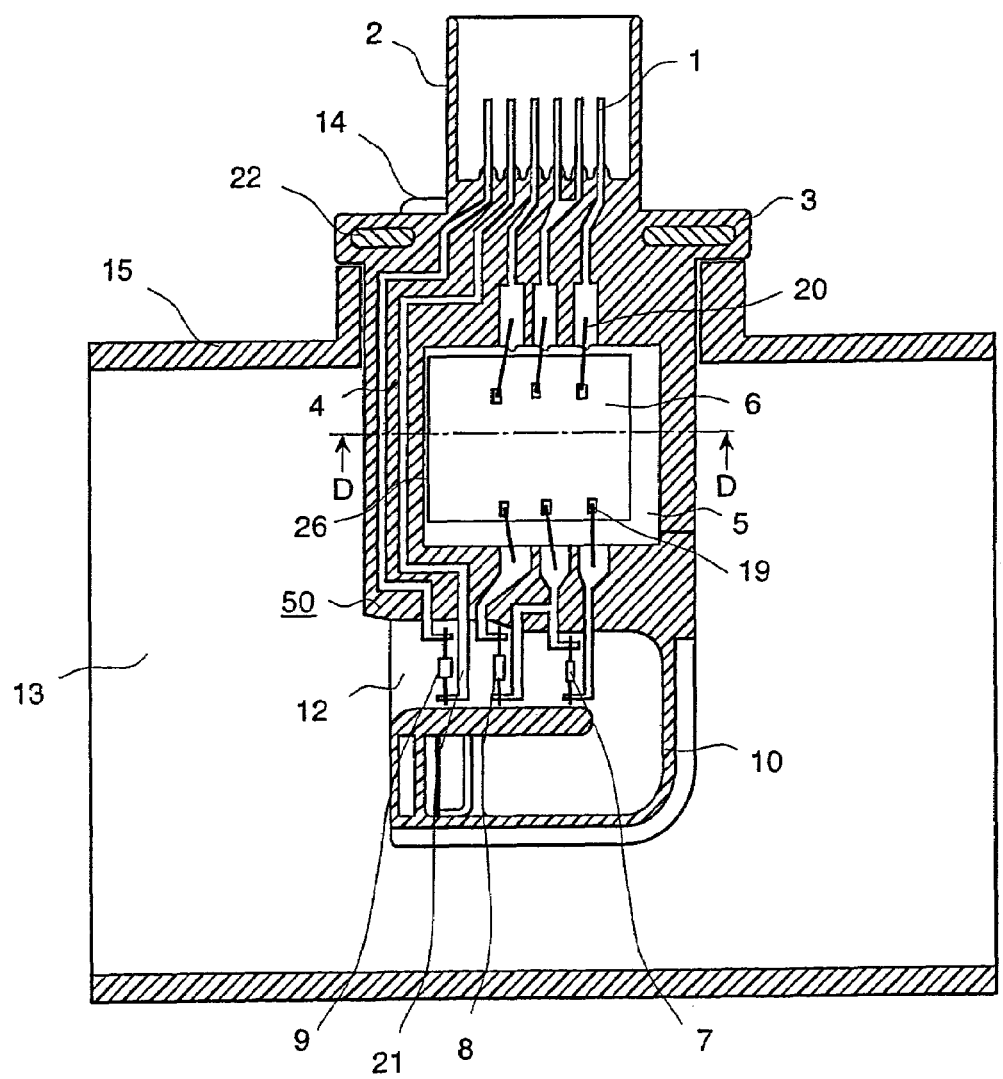
FIG. 19 is a sectional view corresponding to FIG. 19, which shows features of the conventional structure.

FIG. 18 shows another embodiment, and FIG. 19 shows a block diagram of the heat resistance type flow measuring device in the conventional structure.

Although FIG. 18 and FIG. 19 show the section in the same direction as FIG. 2, which is the section perpendicular to the section of FIG. 1, its section is taken at the position where the connector terminal buried under the housing and the support terminal are seen.

In the conventional structure, support terminal 21 of intake temperature sensor 9 is molded integrally with connector terminal 1 directed to the controller of the internal combustion engine as shown in FIG. 19. In addition, support terminal 21 and connector terminal 1 of intake temperature sensor 9 are made of the metal with good thermal conductivity etc., and are influenced easily by the wall temperature.

In the present invention, connector terminal 1 and support terminal 21 of intake temperature sensor 9 are separated, and they are connected electrically through conductor 26 that is provided to electronic circuit 6 as shown in FIG. 18. That is, detection element support terminal 21 for connecting the intake temperature sensor and connector terminal 1 to the controller of the internal combustion engine are connected through conductor 26. For instance, conductor 26, connector terminal 1, and intake temperature sensor support terminal 21 are connected by wire bonding 20 etc.

Figure 20:
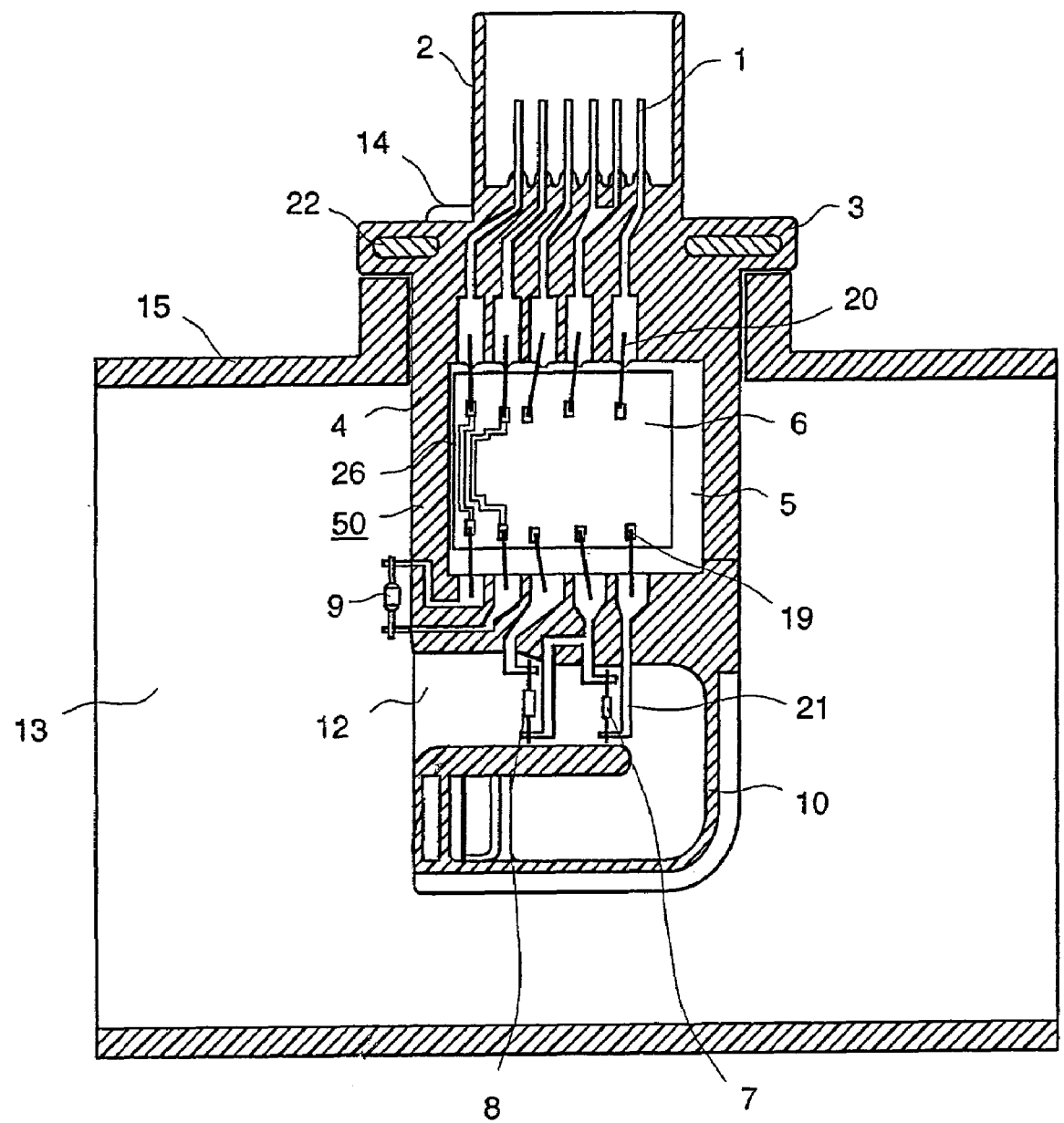
FIG. 20 is a view showing the section which corresponds to the perpendicular side in the section of FIG. 1, which shows a further embodiment of the present invention.

The heat from the outside is transferred through connector terminal 1 itself and is not transferred directly to intake temperature sensor 9. Transferring heat to intake temperature sensor 9 can be decreased because the material with low thermal conductivity is used. Moreover, the above-mentioned idea can achieve a similar effect by the structure that intake temperature sensor 9 shown in FIG. 20 is arranged in intake air passage 13.

A further effect of said embodiment will be explained by using FIG. 21 and FIG. 22.

Figure 21:
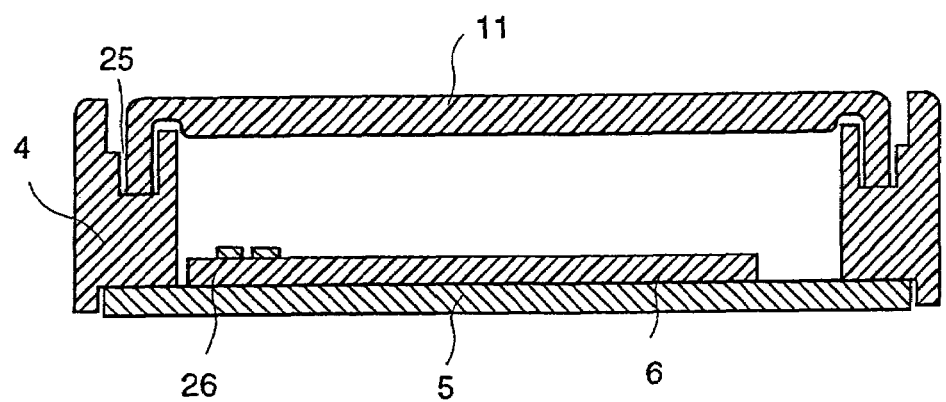
FIG. 21 is a C-C sectional view of FIG. 18.
Figure 22:
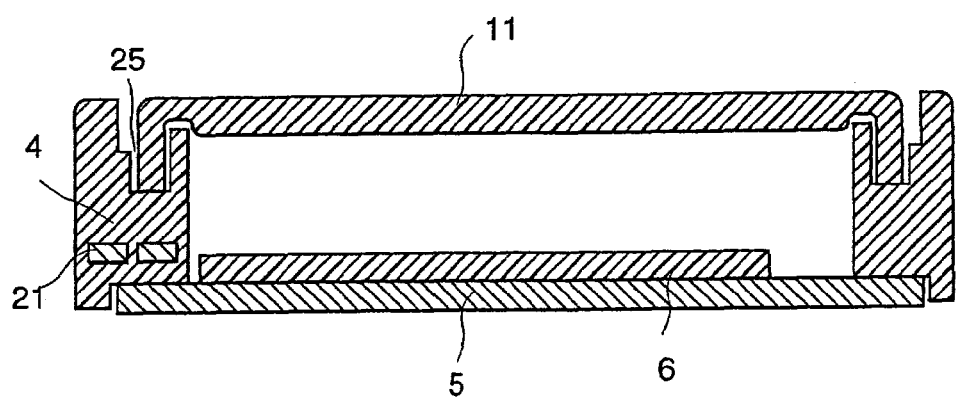
FIG. 22 is a D-D sectional view of FIG. 19.

The C-C sectional view of FIG. 18 is shown in FIG. 21, and the D-D sectional view of FIG. 19 is shown in FIG. 22. The thickness of housing frame body 4 is thick in the conventional structure, because support terminal 21 of intake temperature sensor 9 have to mold in housing frame body 4 as shown in FIG. 22. However, the thickness of housing frame body 4 can thin by adopting the structure of the present invention as shown in FIG. 21. In addition, the resisting part can be deleted from the fluid passage inhaled into the internal combustion engine, and the performance as the internal combustion engine can be improved.

A heat resistance type flow measuring device having the intake temperature detection device with an excellent characteristic of the wall temperature can be provided by adopting the above-mentioned structure according to this embodiment.

A further embodiment of the present invention will be explained next.

Here, in the heat resistance type flow measuring device shown in each of the above-mentioned embodiments, the thermal conduction of the material of support terminal 21 of intake temperature sensor 9 is low compared with the material of connector terminal 1.

As a result, the structure that it is not easy to transfer the wall temperature to intake temperature sensor 9 can be provided, and the heat resistance type flow measuring device with an excellent characteristic of the wall temperature can be provided.

What is claimed is:

1. A heating resistor type flow measuring device, comprising:
    a housing having a support part which is provided between a frame body and a connector and is a fixed portion to an attaching portion of a fluid passage-forming body;
    a flow rate detection element held by the housing on the side of the frame body thereof;
    an electronic circuit held by the housing and electrically connected to the flow rate detection element and the connector;
    a high rigidity member higher in rigidity than the material of a main structural member of the housing integrally molded with the support part; wherein
    the housing is fixed to the attaching portion of the body forming the fluid passage-forming body through the high rigidity member, with the housing positioned in the fluid passage by means of at least one projection and a recess receiving the projection.

2. A heating resistor type flow measuring device according to claim 1, wherein the electronic circuit is held within the frame body of the housing so as to be positioned in the fluid passage.

3. A heating resistor type flow measuring device according to claim 1, wherein the projection is formed on the attaching portion and the recess is formed in the support part.

4. A heating resistor type flow measuring device according to claim 1, wherein the projection and the recess are positioned on an outer side of a seal member provided so as to surround an insertion hole for the frame body formed in the fluid passage-forming body.

5. A heating resistor type flow measuring device according to claim 1, wherein the projection and the recess are provided, with respect to a insertion hole for the frame body which has a nearly rectangular shape, on the side of the two long sides of the insertion hole and are further provided so as to be separated from each other along the longitudinal central axis of the insertion hole.

6. A heating resistor type flow measuring device according to claim 5, wherein the projection and the recess are positioned on the outer side of a seal member provided so as to surround the insertion.

7. A heating resistor type flow measuring device according to claim 5, wherein the support part is fixed with screws to the attaching portion at positions on the outer sides of the two long sides of the insertion hole with respect thereto and the positions at which the support part is fixed are disposed so as to be separated from each other in the opposite direction to the projection and the recess along the longitudinal central axis of the insertion hole.

8. A heating resistor type flow measuring device according to claim 7, wherein the projection and the recess are positioned on the outer side of a seal member provided so as to surround the insertion.

9. A heating resistor type flow measuring device according to claim 1, wherein the main structural member of the housing is made of plastic and the high rigidity element is made of metal.

* * * * *